United States Patent
Larson et al.

(10) Patent No.: US 8,037,770 B2
(45) Date of Patent: Oct. 18, 2011

(54) PRESSURE-SENSOR APPARATUS

(75) Inventors: Thomas A. Larson, Saint Louis Park, MN (US); Gregory C. Brown, Chanhassen, MN (US)

(73) Assignee: Honeywell International Inc., Morristown, NJ (US)

( * ) Notice: Subject to any disclaimer, the term of this patent is extended or adjusted under 35 U.S.C. 154(b) by 747 days.

(21) Appl. No.: 12/124,995

(22) Filed: May 21, 2008

(65) Prior Publication Data

US 2009/0288493 A1 Nov. 26, 2009

(51) Int. Cl.
*G01L 7/00* (2006.01)

(52) U.S. Cl. ................ 73/714; 73/706; 73/716

(58) Field of Classification Search .................. None
See application file for complete search history.

(56) References Cited

U.S. PATENT DOCUMENTS

| | | | | |
|---|---|---|---|---|
| 4,176,557 A | * | 12/1979 | Johnston | 73/708 |
| 4,987,782 A | * | 1/1991 | Shkedi et al. | 73/718 |
| 4,993,754 A | | 2/1991 | Templin, Jr. | |
| 5,000,047 A | | 3/1991 | Kato | |
| 5,483,835 A | * | 1/1996 | Ciolli | 73/726 |
| 5,948,988 A | | 9/1999 | Bodin | |
| 6,425,293 B1 | * | 7/2002 | Woodroffe et al. | 73/756 |
| 6,675,655 B2 | | 1/2004 | Broden et al. | |
| 6,986,285 B2 | * | 1/2006 | Avisse | 73/726 |
| 7,080,558 B2 | | 7/2006 | Broden et al. | |
| 7,819,014 B1 | * | 10/2010 | Broden | 73/718 |

FOREIGN PATENT DOCUMENTS

EP 1498715 1/2005

OTHER PUBLICATIONS

European Patent Office, "European Search Report", May 30, 2011, Published in: EP.

* cited by examiner

*Primary Examiner* — Lisa Caputo
*Assistant Examiner* — Jermaine Jenkins
(74) *Attorney, Agent, or Firm* — Fogg & Powers LLC

(57) ABSTRACT

A pressure-sensing module includes a housing having a process-fluid port configured to be coupled to a process-fluid-flow circuit. The housing defines a first chamber into which the process fluid can flow through the process-fluid port. An isolator assembly is disposed within the housing and includes a fill port. The isolator assembly is configured to define a second chamber into which pressure-coupling fluid may be injected through the fill port. An electronic circuit is disposed within the second chamber and is configured to be pressure coupled by the coupling fluid and isolator assembly to the flow circuit. A plug having first and second ends occupies the fill port thereby sealing the second chamber. The first end is exposed to the process fluid in the first chamber, and the second end is exposed to the coupling fluid in the second chamber.

18 Claims, 2 Drawing Sheets

PRESSURE-SENSOR APPARATUS

BACKGROUND OF THE INVENTION

When sensing pressure in aerospace or other commercial systems, it is often necessary to isolate the process fluid (e.g., fuel) from the electronic sensing elements associated with the pressure sensor. For example, referring to FIG. 1, a conventional pressure-sensor module 10 includes a header housing 20 including a high-pressure port 30 and a low-pressure oil-fill port 40. The high-pressure port 30 is configured to be in fluid communication with a first fluid-flow circuit, such as that associated with the aforementioned process fluid, having a variable or static pressure P1. The oil-fill port 40 is configured to be in fluid communication with a second fluid-flow circuit, which may be the ambient, having a variable or static pressure P2. The module 10 further includes an oil-fill volume 50 defined by a compressive coupling member 60 and sealing off a pressure-sensor assembly 70 from the process fluid. The oil-fill volume 50 is filled through the oil-fill port 40 with inert oil (not shown) and then sealed with a plug 80 inserted into the oil-fill port 40. In normal configurations, the oil-fill port 40 is loaded with the plug 80 subject to the pressure differential between P1 and P2. Loading of the plug 80 under such conditions can result in failure of the plug seal, resulting in sensor failure. To overcome this high loading, the ports are made with thick walls and the plug 80 loaded with deep-penetration sealing welds.

SUMMARY OF THE INVENTION

In an embodiment, a pressure-sensing module includes a housing having a process-fluid port configured to be coupled to a process-fluid-flow circuit. The housing defines a first chamber into which the process fluid can flow through the process-fluid port. An isolator assembly is disposed within the housing and includes a fill port. The isolator assembly is configured to define a second chamber into which pressure-coupling fluid may be injected through the fill port. An electronic circuit is disposed within the second chamber and is configured to be pressure coupled by the coupling fluid and isolator assembly to the flow circuit. A plug having first and second ends occupies the fill port thereby sealing the second chamber. The first end is exposed to the process fluid in the first chamber, and the second end is exposed to the coupling fluid in the second chamber.

BRIEF DESCRIPTION OF THE DRAWINGS

Preferred and alternative embodiments of the present invention are described in detail below with reference to the following drawings.

DETAILED DESCRIPTION OF THE PREFERRED EMBODIMENT

In an embodiment of the invention, the oil-fill port is relocated from its conventional external position on the header or otherwise opening to the atmosphere, to a position internal to the header. This positioning provides approximately equal pressures on opposing sides of the plug, thereby allowing thin-wall header construction and shallow penetration sealing welds, and/or a press fit plug seal.

Figure 1:
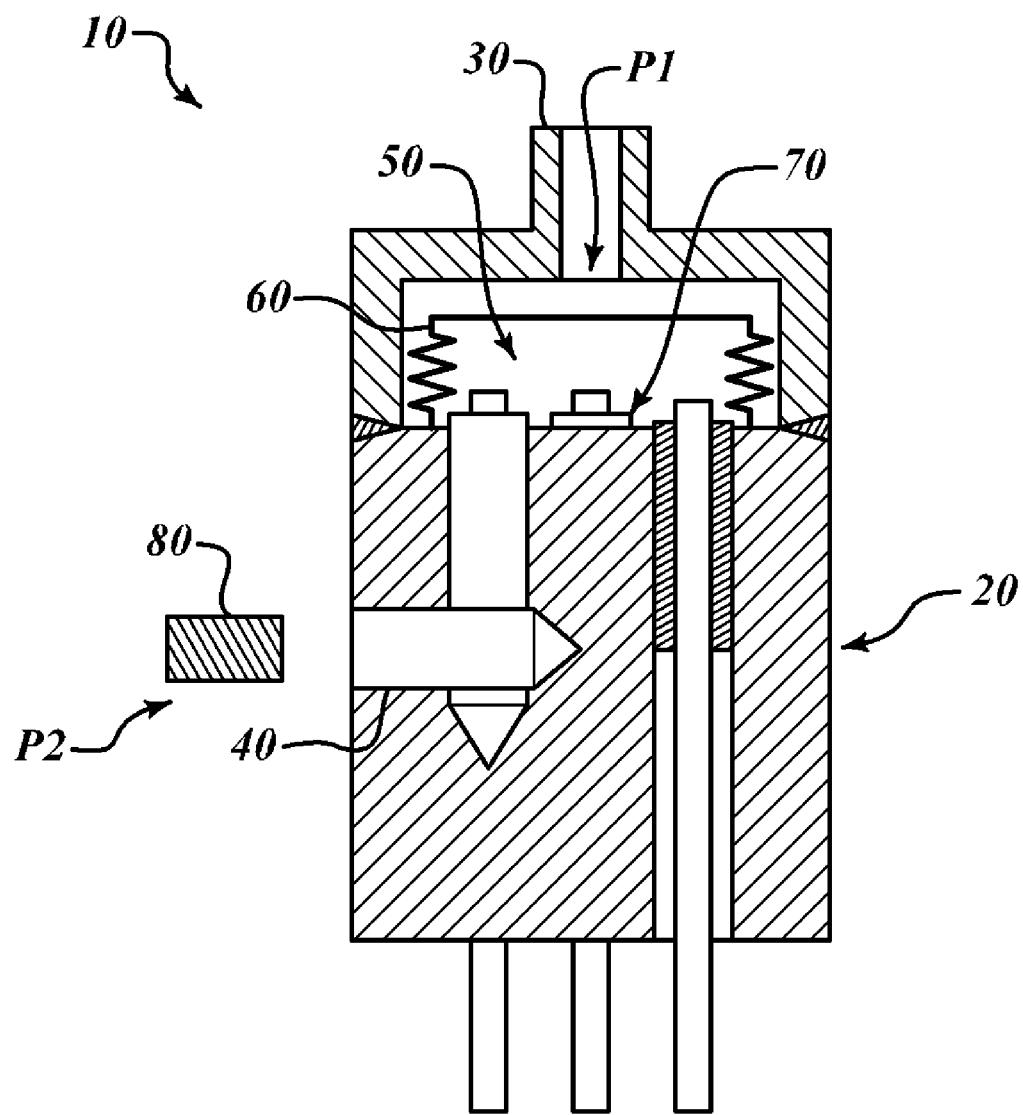
FIG. 1 is a cross-sectional schematic view of a pressure-sensing module according to the prior art.
Figure 2:
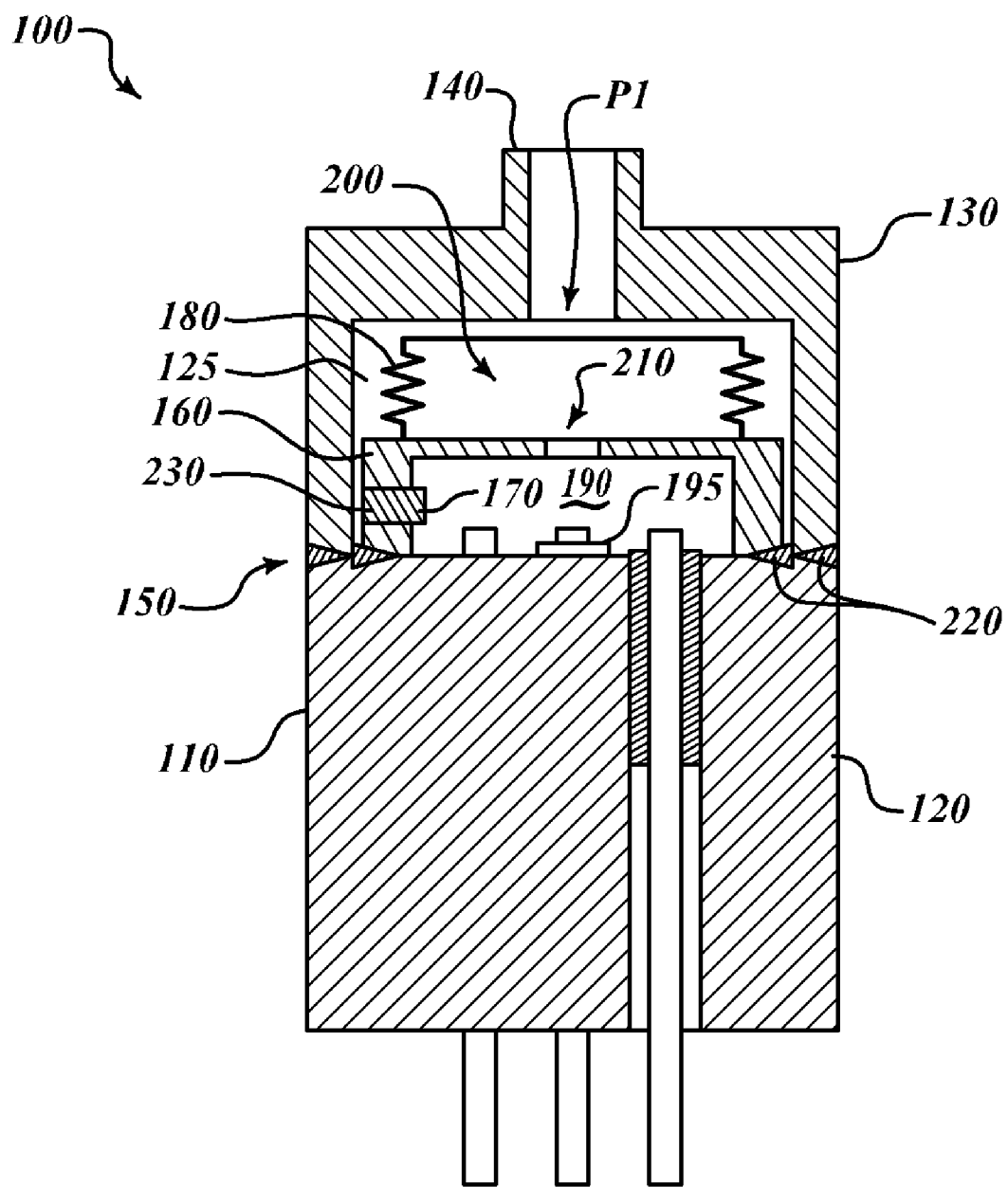
FIG. 2 is a cross-sectional schematic view of a pressure-sensing module according to an embodiment of the present invention.

Referring to FIG. 2, and in an embodiment, a pressure-sensing module 100 includes a header housing 110, which, in turn, includes a base member 120 and a shroud member 130. The shroud member 130 includes a high-pressure port 140 configured to be coupled to a first fluid-flow circuit, such as that associated with the aforementioned process fluid, having a variable or static pressure P1. The base member 120 and shroud member 130 may be coupled together by a deep-penetration weld 150. The base member 120 and shroud member 130 combine to define a first chamber 125 into which the process fluid can flow through the port 140.

The module 100 further includes an isolator assembly disposed within the housing 110. The isolator assembly includes a rigid support member 160, in which a fill port 170 is formed, and a compressible member 180, such as a bellows, coupled to the support member 160. The support member 160 and compressible member 180 combine to define a second chamber 190 into which pressure-coupling fluid may be injected through the fill port 170. An electronic circuit 195 is disposed within the second chamber 190 and is configured to be pressure coupled by the coupling fluid and isolator assembly to the flow circuit. The electronic circuit 195 is further configured to produce at least one electrical signal proportional to a magnitude of the gauge or other pressure of the flow circuit.

When not sealed, the oil-fill port 170 is configured to be in fluid communication at one end with the first chamber 125 and at the other with the second chamber 190. In the illustrated embodiment, a portion of the support member 160 may be configured to create a third chamber 200 in fluid communication with the second chamber 190 through an orifice 210. The support member 160 may be coupled to the base member 120 by a low-penetration (lower strength than the deep-penetration) weld 220.

The module 100 further includes a plug 230 having first and second ends and occupying the fill port 170 thereby sealing the second chamber 190 from fluid communication with the first chamber 125. The first end of the plug 230 is exposed to the process fluid in the first chamber 125, and the second end of the plug 230 is exposed to the coupling fluid in the second chamber 190 such that the pressures seen by each respective end of the plug 230 are approximately equal. As such, in an embodiment, the plug 230 may be press fit, without welding, into the fill port 170.

In an embodiment, the module is built up from machined components by e-beam welding the load bearing components together. The base member 120 is formed and includes the circuit 195. The isolator assembly 160, 180, including the fill port 170, is then affixed to the base member 120. The isolator assembly 160, 180 is configured to define the second chamber 190 into which pressure-coupling fluid may be injected through the fill port 170 to pressure couple the circuit 195 to the process-fluid-flow circuit. The second chamber 190 is then filled with the pressure-coupling fluid. The fill port and first chamber are sealed off with the plug 230. The shroud member 130 is then affixed to the base member 120.

While a preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A pressure-sensing module, comprising:
a housing including a process-fluid port configured to be coupled to a process-fluid-flow circuit, the housing defining a first chamber into which the process fluid can flow through the process-fluid port;
an isolator assembly disposed within the housing and including a fill port, the isolator assembly configured to define a second chamber into which pressure-coupling fluid may be injected through the fill port;
an electronic circuit disposed within the second chamber and configured to be pressure coupled by the coupling fluid and isolator assembly to the flow circuit, the electronic circuit further configured to produce at least one electrical signal proportional to a magnitude of the pressure of the flow circuit; and
a plug having first and second ends and occupying the fill port thereby sealing the second chamber, the first end being exposed to the process fluid in the first chamber, the second end being exposed to the coupling fluid in the second chamber.

2. The module of claim 1 wherein the housing comprises a base member and a shroud member coupled together by a deep-penetration weld.

3. The module of claim 2 wherein the isolator assembly comprises a rigid support member in which the fill port is formed, and a compressible member coupled to the support member, wherein the support member is coupled to the base member by a shallow penetration weld.

4. The module of claim 3 wherein the compressible member comprises a bellows.

5. The module of claim 1 wherein the plug is press fit into the fill port.

6. The module of claim 1 wherein an expansion plug is press fit into the fill port and sealed by expanding the plug using a core that is subsequently pressed into a tapered counter-bore in the plug.

7. An apparatus implementable in a pressure-sensor header including a process-fluid port configured to be coupled to a process-fluid-flow circuit, the header defining a first chamber into which the process fluid can flow through the process-fluid port, the apparatus comprising:
an isolator assembly disposed within the header and including a fill port, the isolator assembly configured to define a second chamber into which pressure-coupling fluid may be injected through the fill port, the second chamber being configured to isolate an electronic pressure-sensing circuit from the process fluid; wherein the fill port is configured to be occupied by a plug having first and second ends to seal the second chamber, the first end being exposed to the process fluid in the first chamber, the second end being exposed to the coupling fluid in the second chamber.

8. The apparatus of claim 7 wherein the header comprises a base member and a shroud member coupled together by a deep-penetration weld.

9. The apparatus of claim 8 wherein the isolator assembly comprises a rigid support member in which the fill port is formed, and a compressible member coupled to the support member, wherein the support member is coupled to the base member by a shallow penetration weld.

10. The apparatus of claim 9 wherein the compressible member comprises a bellows.

11. The apparatus of claim 7 wherein the plug is press fit into the fill port.

12. The apparatus of claim 7 wherein an expansion plug is press fit into the fill port and sealed by expanding the plug using a core that is subsequently pressed into a tapered counter-bore in the plug.

13. A method of constructing a pressure-sensing module, the method comprising:
forming a base member including an electronic pressure-sensing circuit;
affixing an isolator assembly including a fill port to the base member, the isolator assembly configured to define a first chamber into which pressure-coupling fluid may be injected through the fill port to pressure couple the circuit to a process-fluid-flow circuit;
filling the first chamber with the pressure-coupling fluid;
sealing off the fill port and first chamber with a plug having first and second ends; and
affixing a shroud member to the base member, the shroud member including a process-fluid port configured to be coupled to the process-fluid-flow circuit, the base member and shroud member configured to define a second chamber into which the process fluid can flow through the process-fluid port,
whereby the first end is exposed to the process fluid in the second chamber, and the second end is exposed to the coupling fluid in the first chamber.

14. The method of claim 13 wherein the base member and shroud member are coupled together by a deep-penetration weld.

15. The method of claim 13 wherein the isolator assembly comprises a rigid support member in which the fill port is formed, and a compressible member coupled to the support member, wherein the support member is coupled to the base member by a shallow penetration weld.

16. The method of claim 15 wherein the compressible member comprises a bellows.

17. The method of claim 13 wherein the plug is press fit into the fill port.

18. The method of claim 13 wherein an expansion plug is press fit into the fill port and sealed by expanding the plug using a core that is subsequently pressed into a tapered counter-bore in the plug.

* * * * *

UNITED STATES PATENT AND TRADEMARK OFFICE
CERTIFICATE OF CORRECTION

| | | |
|---|---|---|
| PATENT NO. | : 8,037,770 B2 | Page 1 of 1 |
| APPLICATION NO. | : 12/124995 | |
| DATED | : October 18, 2011 | |
| INVENTOR(S) | : Thomas A. Larson | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 819 days.

Signed and Sealed this

Thirteenth Day of March, 2012

David J. Kappos
*Director of the United States Patent and Trademark Office*